United States Patent [19]

Thomas et al.

[11] 4,173,234
[45] Nov. 6, 1979

[54] TRANSFER VALVE

[75] Inventors: David F. Thomas, West St. Paul; Earl A. Platt, Eden Prairie, both of Minn.

[73] Assignee: Waterous Company, South St. Paul, Minn.

[21] Appl. No.: 854,647

[22] Filed: Nov. 25, 1977

[51] Int. Cl.² ............................................ F16K 11/087
[52] U.S. Cl. ............................... 137/625.47; 251/175; 251/181
[58] Field of Search ..................... 137/625.47, 625.41, 137/876; 251/175, 192, 181

[56] References Cited

U.S. PATENT DOCUMENTS

| | | | |
|---|---|---|---|
| 1,352,423 | 9/1920 | Arbon | 137/625.47 X |
| 2,821,998 | 2/1958 | Mayhew | 137/625.47 X |
| 2,996,083 | 8/1961 | Huska | 137/625.47 X |
| 3,532,320 | 10/1970 | Fisch | 251/175 X |
| 3,580,540 | 5/1971 | Heinen | 137/625.47 X |

*Primary Examiner*—Arnold Rosenthal
*Attorney, Agent, or Firm*—Burd, Braddock & Bartz

[57] ABSTRACT

A valve casing is provided with a part-spherical interior sealing surface and with three valve ports each open from the outside of the casing and through the part-spherical sealing surface thereof. A part-spherical valve body or ball is mounted in concentric very slightly spaced relation to this sealing surface of the valve casing. The valve body carries a valve seal structure and is provided with a valve body passage extending through the valve body. The valve body is rotatable within the valve casing between: (1) a first position wherein said valve body passage provides a passageway between a first and a second of the ports and said valve seal structure is in sealing relation to the valve casing sealing surface around a third of said ports; and (2) a second position wherein said valve seal structure is in sealing relation around said first port and said valve body passage provides a passageway between said second and third ports. The valve seal structure includes a valve seal ring concentrically mounted in spaced relation to and around a cylindrical boss extending outwardly from the valve body, resilient means tending to move the seal ring away from the valve body and into sealing relation with respect to the part-spherical sealing surface of the valve casing, and an O-ring sealing the space between the valve seal ring and the valve body boss.

20 Claims, 10 Drawing Figures

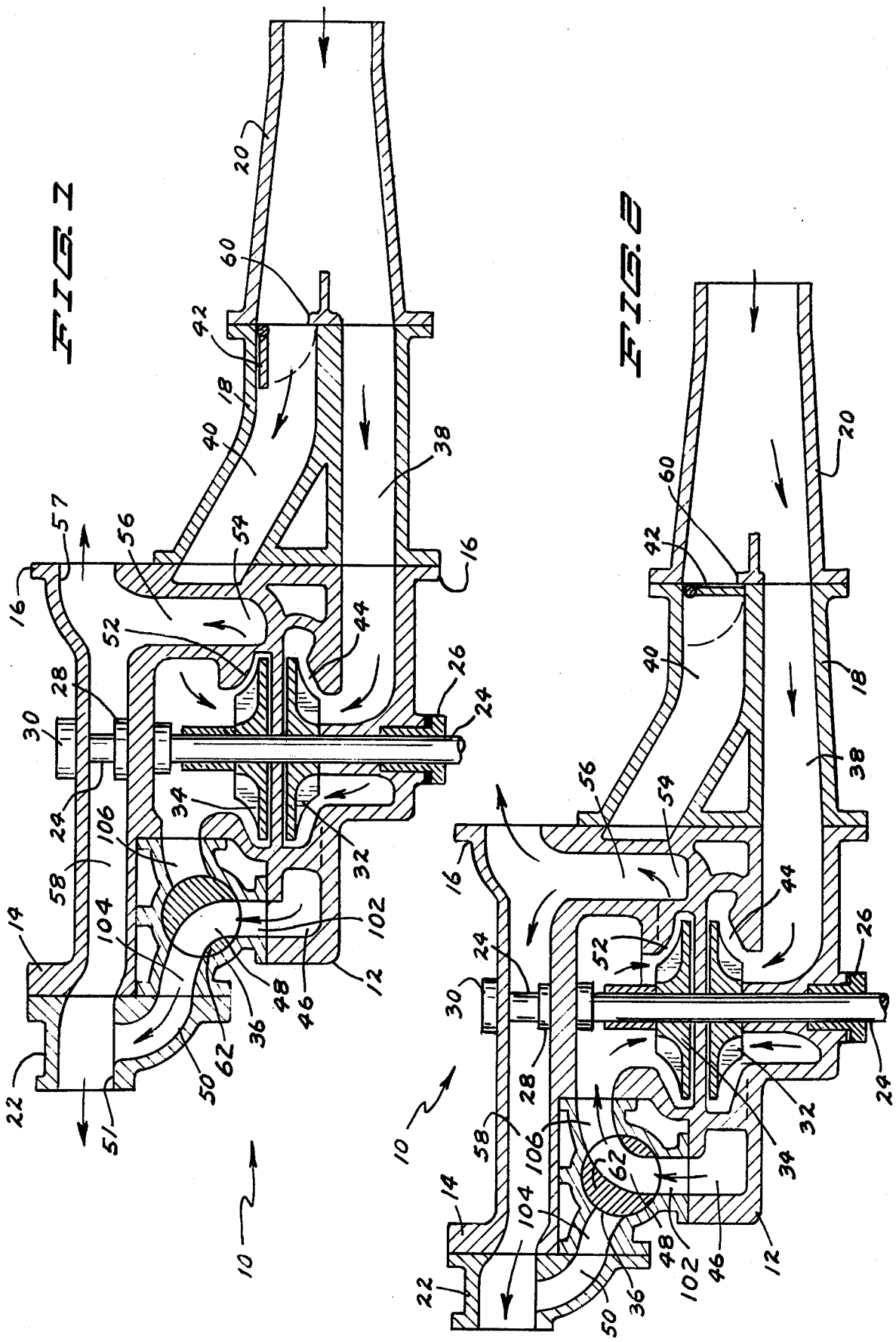

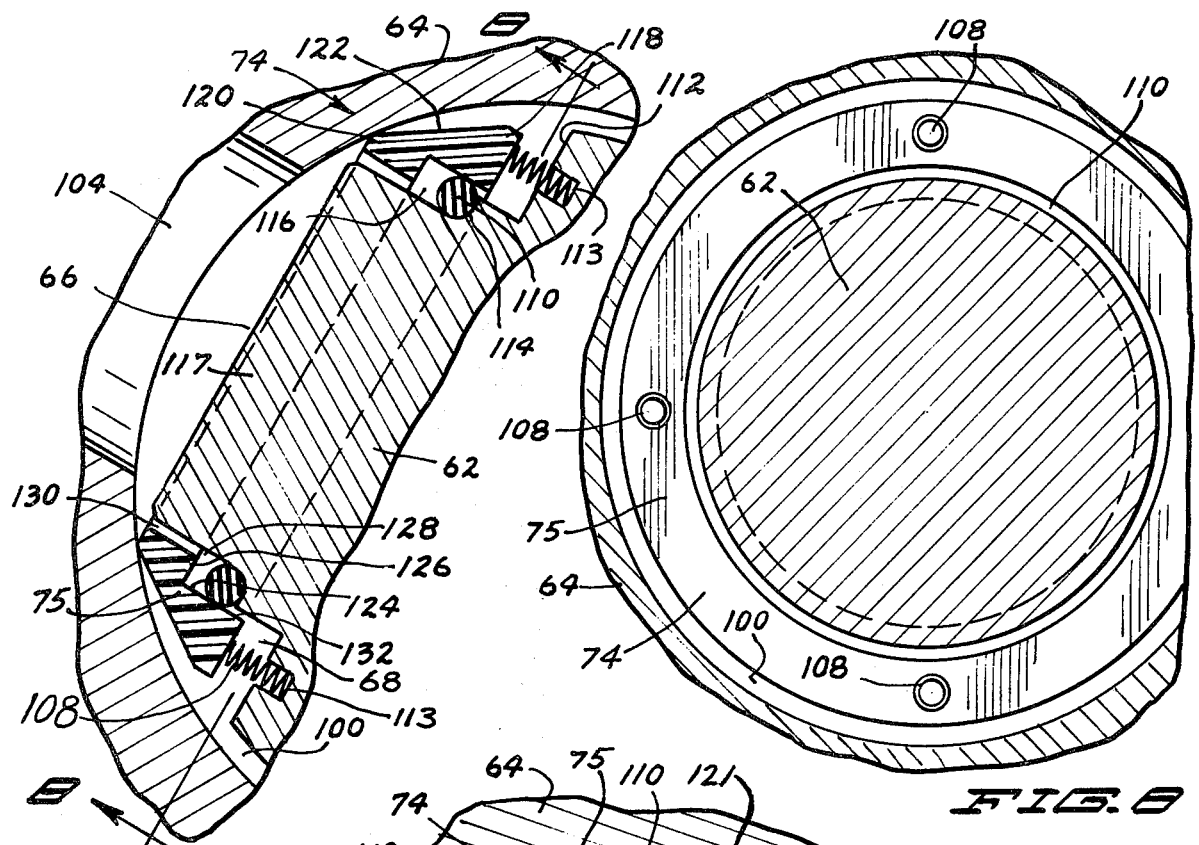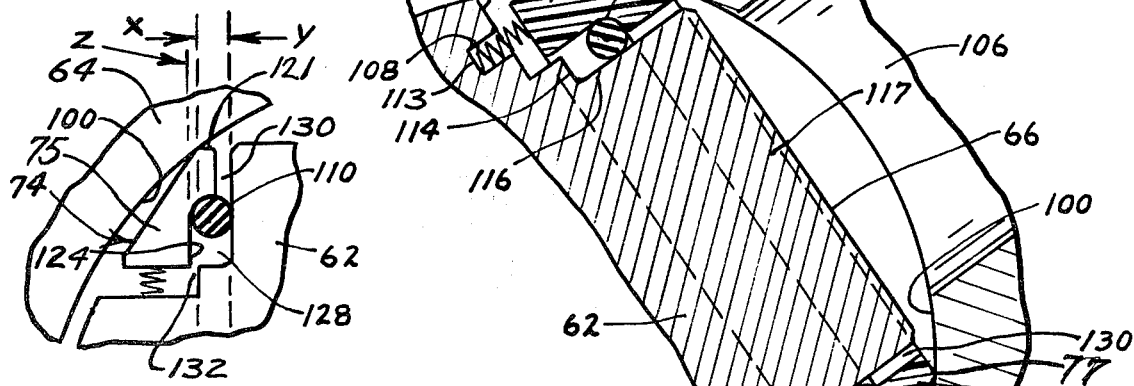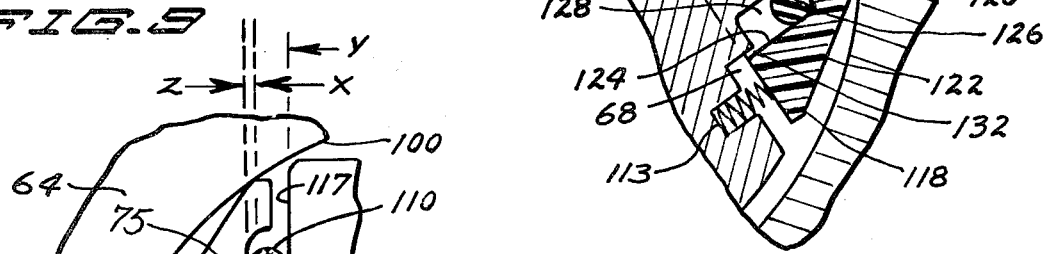

TRANSFER VALVE

BACKGROUND OF THE INVENTION

This invention has relation to a valve which is utilized in connection with a two-stage, series-parallel fire pump as the transfer valve to achieve either series or parallel operation. More broadly, it relates to a so-called three-way valve having at least three ports open therefrom and in which the internal passageways between the ports can be varied to provide a flow path between one combination of ports and a flow path between a second combination of ports.

The valve of the invention is designed to be substituted for the sleeve or "plug" valve as shown in U.S. Pat. No. 2,900,918 to Thomas et al, granted on Aug. 25, 1959.

This invention also relates to ball type valves wherein the valve body or ball is part-spherical and rotates in a part-spherical cavity in a valve casing. Such a valve is shown in the Thomas et al patent, U.S. Pat. No. 2,800,295, granted in July of 1957.

In U.S. Pat. No. 2,800,295, the water or fluid seal is accomplished by having a sleeve force an O-ring against the outer surface of the part-spherical portion of the valve body or ball. It is typical of ball valves of the prior art that the seals are stationary and the cooperating sealing surfaces are on the ball. In the case of transfer valves this requires two stationary valve seal structures mounted in the valve casing. In contrast, in transfer valves made according to this invention, only one seal structure is required and it moves with the ball while the cooperating sealing surfaces are part of the stationary valve casing.

Typical "three way" ball valves of the prior art divert fluid flow from a common port to either of two other ports through a passageway which causes the fluid to deviate from a linear flow path by 90°.

In contrast, in transfer valves made according to the form of the invention as shown, the ports are located at 120° from each other so that the flow path deviates from a linear path by only 60° in either position of the valve.

In transfer valves of the type here involved, there should be no substantial leakage between a valve port which is to be closed during a certain positioning of the valve and the two valve ports which are open to each other through the part-spherical valve body or ball; but often some slight leakage at this point does not seriously affect the operation of a system including the transfer valve.

Conversely, any "leakage" between the two mutually open ports due to clearance between the valve casing and the valve body, for example, is not really "leakage" at all, and in no way inhibits the effectiveness of the valve.

No special search of the prior art has been made, and the two patents cited above, represent the closest prior art presently known to the applicant.

BRIEF SUMMARY OF THE INVENTION

A transfer valve of the present invention includes a part-spherical valve body or ball rotatably mounted in concentric and closely spaced relationship to a provided part-spherical cavity in a valve casing. This casing has a plurality of valve ports which open from outside of the casing to the interior of a part-spherical interior sealing surface of the valve casing.

In the form of the invention shown, the valve body or ball is provided with a valve body passage and a valve seal structure. Said passage is situated to be in alignment with each of a pair of the valve ports and the valve seal structure is situated to be in sealing relation around another of the valve ports when the valve ball is situated in a first position. Said passage is situated to be in alignment with each of a different pair of the valve ports and the valve seal is situated to be in alignment with another of the valve ports when the valve ball is situated in a second position.

The sealing relationship of the valve seal structure with respect to the periphery of a valve port is obtained by urging a valve seal ring outwardly from the valve body or ball into sealing contact with the part-spherical interior sealing surface of the valve casing around the valve port to be sealed off. This valve seal ring is mounted in concentric, spaced relationship with respect to a cylindrical boss forming a part of and extending outwardly from the valve body. This boss is within the envelope of a sphere defined by the part-spherical outer surface of the valve body. The space between the valve seal ring and the valve body boss is sealed by a resilient O-ring situated in an O-ring groove or annular sealing chamber provided between concentric cylindrical spaced apart surfaces of the valve seal ring and the cylindrical valve body boss.

In the form of the invention as shown, resilient means acting between the valve body and the valve seal ring urge the seal ring outwardly into sealing relationship with respect to the part-spherical interior sealing surface of the valve casing.

As shown, the valve casing is constituted as two separate halves each encompassing exactly half of the sphere defined by the part-spherical interior sealing surface of the valve casing. With this construction, the sealing is done against the interior part-spherical surface of the casing, and not against the exterior part-spherical surface of the valve body or ball, so the manufacturing tolerances with respect to the part-spherical outer surface of this body or ball can be very wide indeed without affecting the operation of the valve.

On the other hand, since the only sealing relationship necessary to the proper operation of the valve is in the area immediately around the mouth of each of the ports which is to be sealed off, precise and exact machining of the part-cylindrical surface of the casing is only absolutely required right around this area. It is sufficient that the other "part-spherical" interior surface areas of the valve casing are simply smooth enough to let the valve seal ring move freely over them between sealing relationship with respect to one port to sealing relationship with respect to the next port.

Since the valve seal ring is "free floating" with respect to the part-spherical valve body or ball, the seal ring is free to conform in spite of foreign material such as sand between the part-spherical interior sealing surface of the valve casing and the part-spherical exterior surface of the valve body or ball. The sealing is done between the seal ring and the part-spherical interior sealing surface of the valve casing, so the exterior part-spherical surface of the valve body can be spaced in clearing relationship to the part-spherical interior surface of the valve casing.

Variations in structure are possible within the spirit of the invention and the scope of the claims which follow. For example, when it is essential that the fluid being transferred by the transfer valve be denied access to the space between the part-spherical interior sealing surface of the valve casing and the part-spherical exterior surface of the valve body or ball, valve seal structures will be installed around bosses in the manner as shown herein and the bosses themselves positioned around each end of the valve body passage.

Also, the valve of the invention can be adapted to use as a "two-way" valve useful to turn a liquid or other fluid flow on or off. The valve body passage can be comprised as an opening to a side of the valve body and not necessarily as a tunnel through that body.

While the transfer valve herein disclosed is shown as including an independent casing mounted within a larger pump housing, it is to be understood that this was done for clarity of illustration. The pump casing can be an integral part of the pump body, and the claims which follow read on a valve having such an integral casing as well as on a valve having an independent casing.

BRIEF DESCRIPTION OF THE DRAWINGS

FIG. 1 is a sectional view of a two-stage, series/parallel centrifugal pump taken along a horizontal plane through its center, showing a somewhat schematic view of a transfer valve of the invention positioned to cause the pump stages to operate in parallel;

FIG. 2 is a like sectional view of the pump of FIG. 1 with the transfer valve positioned for series operation of the pump stages;

FIG. 6 is a further enlarged sectional view of a portion of the valve positioned as in FIG. 3;

FIG. 7 is a similarly enlarged sectional view of a portion of the valve positioned as in FIG. 4;

FIG. 8 is a sectional view taken along line 8—8 in FIG. 7;

FIG. 9 is a diagrammatic representation of particular valve parts in parallel operation as in FIGS. 1, 3 and 6; and FIG. 10 is a diagrammatic representation of said valve parts in series operation as in FIGS. 2, 4 and 7.

DETAILED DESCRIPTION OF PREFERRED EMBODIMENT

Figure 3:
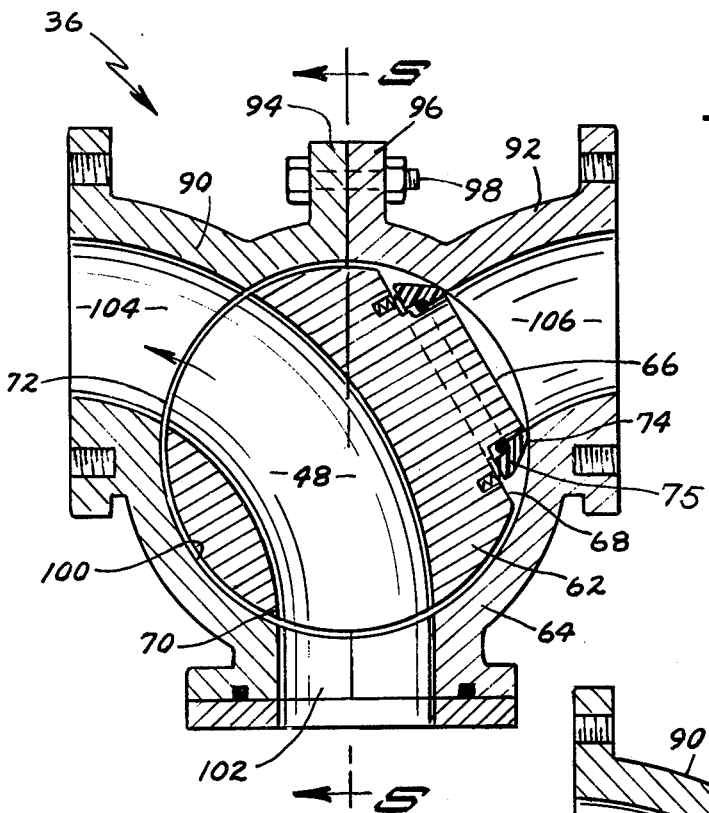
FIG. 3 is an enlarged detail sectional view of the transfer valve as seen in FIG. 1.

Referring to FIGS. 1 and 2, there is shown in section a centrifugal pump 10 of a type commonly used in connection with fire-fighting equipment. Both sectional views are taken along a horizontal plane passing through the pump center. Pump 10 has a housing 12 flanged at both ends as shown at 14 and 16 for connection with attachments including an intake manifold 18 with intake manifold extension 20, and a discharge manifold 22, respectively.

A pump impeller shaft 24 is rotatably supported with respect to housing 12 through a first shaft bearing 26, a second shaft bearing 28 and an end bearing 30. Attached to shaft 24 and rotatable therewith are a first impeller 32 and a second impeller 34. A transfer valve 36 has a valve body or ball 62 which is pivotally mounted with respect to the housing about a vertical axis transverse to and spaced from the axis of shaft 24. Valve ball 62 is csapable of rotation either clockwise or counterclockwise as viewed in FIGS. 1, 2, 3 and 4.

The function of each of impellers 32 and 34 is to increase the pressure of a fluid, for example water, passing through it. Fluid enters each impeller proximate the impeller shaft, but is rapidly directed radially outward of the impeller due to rotation of the impeller with shaft 24 and leaves the impeller at a somewhat greater pressure and significantly higher velocity. Entering a passageway or volute immediately beyond the perimeter of the impeller, the fluid undergoes a velocity decrease and a simultaneous increase in pressure, as the kinetic energy or head of the fluid is transformed into a greater pressure head.

Pump 10 can be adapted for either series or parallel operation by the selective positioning of the transfer valve 36 of the present invention. Parallel operation is shown in FIG. 1. Fluid under an intake pressure $P_o$ enters pump 10 at intake manifold extension 20 and flows into intake manifold 18 via either a first intake passage 38 or a second intake passage 40. The fluid entering the second intake passage 40 opens a flap valve 42 hingedly connected to intake manifold 18. Due to the fluid pressure differential, flap valve 42 remains in the open position shown in FIG. 1.

As shown by the arrows, fluid passing through first intake passage 38 enters a first impeller chamber 44 in which the first impeller 32 is housed. Fluid flow into impeller 32 is generally proximate shaft 24. Due to the relatively high speed of shaft rotation, fluid between blades of impeller 32 is directed radially outward by "centrifugal force" and leaves impeller 32 at the impeller perimeter remotely of shaft 24. The fluid at this point has a much higher velocity, and a somewhat higher pressure, than it did upon entering impeller 32. Upon leaving the first impeller, fluid enters a first volute 46 where it is "collected" in the sense that its velocity is reduced while its pressure is increased to a first stage discharge pressure $P_1$, substantially greater than intake pressure $P_o$. Beyond first volute 46, fluid passes through a valve body passage 48 in valve body 62 into a first discharge passage 50 in discharge manifold 22, and finally out via a first pump exit 51 and through a longitudinal passage 58 and out via a second pump exit 57, to its end use, for example to fire hoses or the like.

Fluid entering second intake passage 40 travels to a second impeller chamber 52 containing second impeller 34, flowing generally proximate shaft 24. Structurally, second impeller 34 is substantially similar to first impeller 32. Being mounted to shaft 24, second impeller 34 rotates at a speed equal to that of the first impeller 32. Second impeller 34 affects fluid from intake passage 40 in a substantially similar manner, discharging it at the outer impeller perimeter at a slightly greater pressure and substantially higher velocity. Fluid leaving second impeller 34 is directed into a second volute 54 where its velocity is reduced and its pressure increased to a second stage parallel discharge pressure $P_{2p}$, substantially equal to the first stage discharge pressure $P_1$. From second volute 54, fluid is channeled through a second discharge passage 56 contained in housing 12, and then out via pump exits 51 and 57 to the desired end use.

In FIG. 2, transfer valve 36 is positioned to condition pump 10 for series operation. The adjustment from parallel to series operation is accomplished by a 120° rotation of ball 62, counterclockwise as viewed in FIGS. 1 and 2. A comparison of the flow direction arrows of FIG. 2 with those in FIG. 1 indicates changes in direction of the flow of fluid through pump 10. First of all, fluid from manifold extension 20 enters only first intake passage 38. For reasons to be explained, flap valve 42 remains closed thereby preventing fluid flow directly from the manifold extension to second impeller chamber 52.

Fluid at intake pressure $P_o$ from first intake passage 38 enters first impeller chamber 44, travels through first impeller 32 and is discharged into first volute 46 with a pressure of $P_1$ as previously described. The fluid does not travel through valve 36 to first discharge passage 50, however. Instead, fluid is directed through valve passage 48 into second impeller chamber 52, whereupon it enters second impeller 34 flowing generally proximate shaft 24. Initially, some of the fluid in second impeller chamber 52 flows backward, into second intake passage 40, since the fluid in second impeller chamber 52 is at first stage discharge pressure $P_1$, greater than intake pressure $P_o$. Flap valve 42 closes in response to this backflow to prevent further backflow into manifold extension 20. A stop 60 prevents rotation of flap valve 42 beyond the closed position shown in FIG. 2. As soon as the second intake passage is filled with fluid at pressure $P_1$, all fluid discharged from first impeller 32 enters second impeller 34.

Fluid passing through second impeller 34 is discharged into second volute 54 and collected at a second stage series discharge pressure $P_{2s}$. $P_{2s}$ is substantially greater than second stage parallel discharge pressure $P_{2p}$. From second volute 54, fluid is channeled through second discharge passage 56, beyond which the fluid leaves pump 10 through exits 51 and 57.

Return to parallel operation is achieved by rotation of transfer valve 36° to 120° clockwise as viewed in FIGS. 1 and 2. With fluid no longer directed from first volute 46 into second impeller chamber 52, and with second impeller 34 drawing from second intake passage 40, intake pressure $P_o$ will open flap valve 42.

As compared to parallel operation, series operation results in fluid being discharged from pump 10 at a substantially higher pressure. The series operation is most useful where the fluid must travel a substantial distance beyond pump 10, for example through a relatively long fire hose or the higher stories of a burning building. In parallel operation, pump delivers a higher volume at pressure $P_{2p}$.

Figure 4:
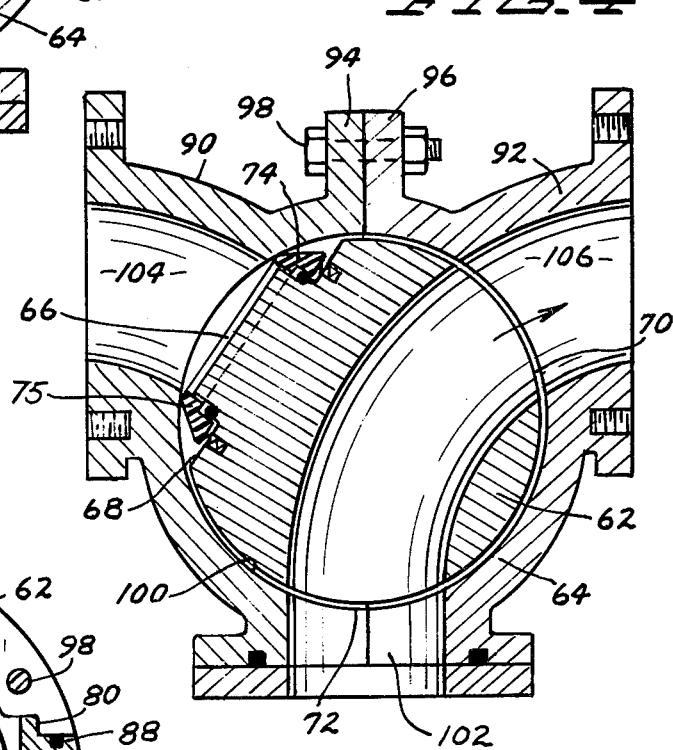
FIG. 4 is an enlarged detail sectional view of the valve as seen in FIG. 2.
Figure 5:
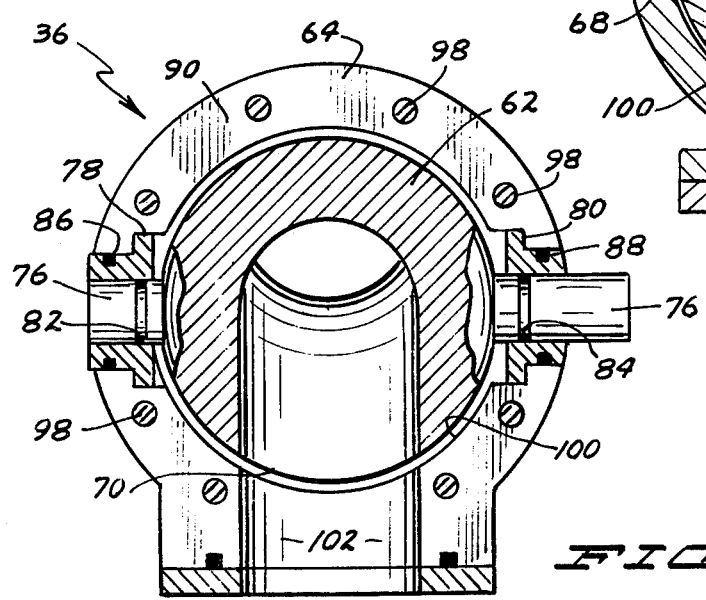
FIG. 5 is a sectional view taken along the line 5—5 in FIG. 3.

FIGS. 3 through 5 show transfer valve 36 in greater detail. Valve 36 includes valve body or ball 62 supported within a valve casing 64 for rotation in the clockwise and counterclockwise directions as viewed in FIGS. 3 and 4. Valve body 62 can be steel, brass or the like. It has a generally spherical exterior surface except for a cylindrical boss 117 terminating in a substantially flat and circular face 66, a circular opening at a first end 70 of valve body passage 48, a circular opening at a second end 72 of the valve body passage, and an annular groove 68. Groove 68 accommodates a valve seal ring 75, resiliently mounted with respect to valve body or ball 62 around boss 117 and urged outward toward valve casing 64 by means later described herein. For maximum wear resistance, valve seal ring 75 will be constructed of metal. However, it is understood that in application requiring a tighter seal, valve seal ring 75 can be formed at least in part of rubber or another flexible sealing material. The boss 117, the seal ring 75, and means for resiliently mounting the seal ring on the boss 117 and uring it outward toward the valve casing are all parts of a valve seal structure, denoted generally at 74.

The mounting of valve ball 62 is best seen in FIG. 5. A valve axle 76, extending outwardly of the valve ball in opposing directions, is rotatably supported within a first valve axle bearing 78 and a second valve axle bearing 80. Bearings 78 and 80, in turn, are mounted within valve casing 64. Fluid leakage between axle 76 and casing 64 is prevented by first and second O-rings 82 and 84 between the axle and bearings 78 and 80, respectively, and third and fourth O-rings 86 and 88 between these bearings and casing 64.

Valve casing 64 includes opposed first and second valve casing sections 90 and 92 which are joined along a plane containing the longitudinal axis of valve axle 76. Together these sections define a part-spherical interior sealing surface 100. A first casing flange 94 extends radially outward of first casing section 90 and terminates in said plane; while an opposing second casing flange 96 extends radially outward of second casing section 92 to terminate in said plane. Flanges 94 and 96 are secured against one another on said plane by a plurality of nut and bolt assemblies 98.

The part-spherical interior sealing surface 100 of valve casing 64 has openings defining a first or common port 102, a second port 104, and a third port 106. While common port 102 is positioned along the faces of casing sections 90 and 92, ports 104 and 106 are spaced remote therefrom, assuring that the sealing surface portions proximate ports 104 and 106 are integral i.e., not interrupted by the casing section faces. This eliminates one possibility for leakage.

An assembly including valve body or ball 62, axle 76 and the supporting bearings and O-rings is inserted into one of casing sections 90 or 92 before they are fastened together. Within assembled casing 64, ball 62 is supported solely by bearings 78 and 80 acting through axle 76.

Movement of the valve ball 62 in direction longitudinally along the axis of the valve axle 76 is restrained only by the valve seal structure including seal ring 75 bearing on the spherical sealing surface 100 of the valve casing 64. The pressure buildup in the valve casing when the valve is in use is resisted along each of the stems of valve axle 76 by equal diameter O-rings 82 and 84, respectively. This insures that the forces on the ball 62 are hydraulically balanced along the axis of the axle 76 so that the ball will not be displaced longitudinally to cause the seal ring 75 to move from the cooperating sealing surface 100 to permit leakage.

With pump 10 in parallel operation as seen in FIGS. 1 and 3, fluid from first port 102 enters valve ball 62 at first end 70 of passage 48 and leaves the valve ball at second end 72 thereof to enter second port 104. The valve setting is changed from parallel to series operation by a counterclockwise rotation of valve axle 76 and valve ball 62 through 120° as seen in FIGS. 1 and 3. The positioning of parts as a result of such rotation is shown in FIGS. 2 and 4. In series operation, fluid continues to enter ball valve 62 from common port 102. However, fluid enters the valve ball at second end 72 of valve passage 48 and leaves the valve ball at first end 70 thereof entering third port 106 rather than second port 104. In either case the fluid is diverted from its initial linear path by only 60°, as opposed to the 90° diversion of typical prior art three-way valves. As a result, there is less pressure drop through the valve.

FIGS. 6 through 10 illustrate the manner in which valve seal ring 75, responsive to a fluid pressure differential, is continually biased into sealing relation against sealing surface 100 in surrounding relation to either port 104 or port 106.

Rotation of valve body or ball 62 about the axis of valve axle 76 selectively positions circular face 66 in blocking relation to either second port 104 or third port 106, thereby cooperating with concentric valve seal ring 75 to prevent fluid beyond the selected port from flowing into or from the space between valve ball 62 and interior valve casing sealing surface 100.

FIGS. 6 through 8 are enlarged views of portions of valve ball 62 proximate flat circular face 66. Valve seal ring 75 in groove 68 is resiliently mounted in space relation to valve ball 62 through coil springs 108, two of which are seen in FIGS. 6 and 7.

As best seen in FIGS. 6 and 7, annular groove 68 is partially defined by a flat and annular first shelf or shoulder 112 parallel to face 66 and spaced from that face. A flat and annular second shelf or shoulder 114 is provided between face 66 and first shelf 112 and is parallel thereto. The groove 68 is further defined by a flat and cylindrical exterior wall surface 116 between face 66 and second shelf 114, and perpendicular thereto; this wall surface 116 and face 66 also defining the cylindrical boss 117.

As perhaps best seen from FIGS. 6 and 7, each spring is mounted in a recess 113 in shoulder 112. Springs 108, all under compression, tend to urge valve seal ring 75 into sealing contact with interior sealing surface 100. Between valve ball 62 and valve seal ring 75 is an annular sealing ring or O-ring 110, which can be made of a flexible material such as rubber. O-ring 110, seal ring 75, boss 117, and valve ball 62 are symmetrical about a valve ball central axis perpendicular to face 66 and passing through the ball center.

Valve seal ring 75 is roughly triangular in cross section and includes a base 118 and a shoulder 120 above the base and extending radially inwardly of the base. An oblique conical outer surface 122 spans the height of seal ring 75 from the base to the top of shoulder 120. Base 118 is partially defined by a cylindrical interior wall surface 124 in parallel spaced relation to exterior wall surface 116 of boss 117. Shoulder 120 is defined by a shoulder bottom surface 126 adjacent to and normal to inside wall surface 124. This surface 126 is in parallel spaced relation to second shelf 114 of annular groove 68.

Second shelf 114 and wall surface 116 of valve ball 62, and inside wall surface 124 and bottom surface 126 of valve seal ring 75 together define an annular sealing chamber or O-ring groove 128 of substantially uniform rectangular cross section. Fluid flow into and out of O-ring groove 128 is accomplished through a first annular passage 130 between wall surface 116 of boss 117 and seal ring 75, and through a second annular passage 132 between ball 62 and wall surface 124 of valve seal ring 75.

O-ring 110, contained in O-ring groove or chamber 128, has a cross sectional diameter or width approximately equal to the groove width. The O-ring 110 is movable, responsive to differentials in fluid pressure, in either direction parallel to a valve ball radius normal to ball face 66.

In FIGS. 6 and 9, valve ball 62 is shown as being positioned for parallel operation. From the prior description relating to FIG. 1, it is apparent that fluid in valve passage 48 and throughout the space between valve ball 62 and sealing surface 100 is at first stage discharge pressure $P_1$. The fluid near valve face 66, on the other hand, is at intake pressure $P_o$. In the absence of valve ball 62, the pressure differential between $P_1$ and $P_o$ would cause fluid flow from the valve chamber through port 106 into second intake passage 40. The valve body or ball and the valve seal structure 74 prevent this flow. Coil springs 108 bias valve seal ring 75 in contact with sealing surface 100 over an annular contact area thereby substantially preventing the flow of fluid between the valve seal and sealing surface; and the difference between higher pressure $P_1$, and lower pressure $P_o$ forces O-ring 110 to position as seen in FIGS. 6 and 9.

In parallel pump operation as seen in FIGS. 1, 3, 6 and 9, the intake pressure $P_o$ will be acting on the valve seal ring 75 and the O-ring 110 to tend to force them away from the sealing surface 100 over an area of a circle having a diameter "x" less the area of a circle having a diameter "y", where:

x = diameter of a nose or circle of contact 77 of seal ring 75 with sealing surface 100, and y = diameter of cylindrical wall surface 116.

At the same time first stage discharge pressure $P_1$ will be acting to force the valve seal ring 75 and O-ring 110 toward the sealing surface 100 of the valve casing 64 over an area of a circle having a diameter of "z" less the area of a circle having a diameter of "y", where "x" and "y" are as set out above and:

z = diameter of surface 124.

But the area between "x" and "z" on conical surface 122 is also being acted upon by first stage discharge pressure $P_1$ and in the direction away from the sealing surface 100. Therefore, the area over which pressure $P_1$ is effectively forcing the valve seal ring 75 toward sealing surface 100 is that between x and y, the same area over which the pressure $P_2$ is forcing the valve seal ring and O-ring 110 away from that surface. The net force in the direction of sealing is equal to the difference between pressures $P_1$ and $P_o$ times the area between circles having diameters of "x" and "y".

FIGS. 7 and 10 illustrate valve ball 62 in position for series operation. As previously explained, in series, fluid in valve body passage 48 and in the majority of space between valve ball 62 and sealing surface 100 of valve casing 64 is at first stage discharge pressure $P_1$, just as in parallel operation. Fluid near second port 104, however, is at second stage series discharge pressures $P_{2s}$ which is greater than $P_1$. Without transfer valve body or ball 62 there would be a flow of fluid from first discharge passage 50 through second port 104 and into the first volute 46. Valve ball 62 and valve seal structure 74 act to prevent this backward flow.

Coil springs 108 bias valve seal ring 75 against sealing surface 100 of valve casing 64, to tend to prevent fluid flow between the seal ring and the sealing surface.

The pressures on valve seal ring 75 also enhance the sealing action in series pump operation. As seen in FIGS. 2, 4, 7 and 10, the second stage series discharge pressure $P_{2s}$ acts on the area of a disc-like nose wall 121 of shoulder portion 120 of valve seal ring 75 to urge valve seal ring 75 away from surface 100. Because this pressure also acts inside annular sealing chamber or O-ring groove 128, pressure $P_{2s}$ also acts on bottom surface 126 of this shoulder portion 120 of the seal ring 75. The nose contact circle 77 of the seal ring 75 with sealing surface 100 has a lesser diameter "x" than the diameter "z" of the cylindrical inner wall surface 124 of the base portion 118 of the seal ring; so the net effect of pressure $P_{2s}$ is to urge the seal ring toward sealing surface 100 over an area between a circle having diameter "z" and a circle having a diameter "x".

The first stage discharge pressure $P_1$ also acts in both directions on the valve seal ring 75. It acts from the nose contact circle of the seal ring 75 (diameter="x") outwardly to tend to force the seal ring away from surface 100; and from the diameter of wall surface 124 outwardly to tend to force the seal ring 75 toward the surface 100. The net effect of pressure $P_1$ is, then, to urge the seal ring 75 away from surface 100 over an area between a circle having a diameter "z" and a circle having a diameter "x".

Thus, the force urging the seal ring 75 toward sealing surface 100 is equal to the difference between $P_{2s}$ and $P_1$ times the area between circles having diameters of "z" and "x".

The sealing quality of transfer valve 36 can be improved, if necessary, by replacement of valve seal ring 75 with a valve seal ring having a shoulder portion 120 at least partially formed by rubber or another flexible material, particularly over the area of contact between the valve seal ring and interior sealing surface 100 of casing 64. Interior wall surface 124 preferably remains a metal surface, however, as the pressure responsive movement of O-ring 110 is most efficient under conditions of minimum friction between that O-ring and wall surfaces 116 and 124.

The embodiments of the invention in which an exclusive property or privilege is claimed are defined as follows:

1. A fluid transfer valve including:
   (a) a valve casing provided with a part-spherical interior sealing surface defining a valve cavity, said casing being provided with at least three valve ports open from outside said casing and through said sealing surface into said cavity;
   (b) a valve body provided with a part-spherical outer surface forming part of the outer wall of said valve body and defining a sphere of diameter only slightly less than a sphere defined by the part-spherical interior sealing surface of the valve casing;
   (c) said valve body being provided with a valve passage therethrough;
   (d) a valve seal structure movable with the valve body and including a portion of said valve body defined by a fluid impervious circular face, an annular valve seal ring in sealing, surrounding relationship to said valve body face, and means to urge said valve seal ring outwardly from said valve body, said valve seal structure being adapted to seal the interior of one of said valve ports from the remainder of the valve cavity and from said passage in the valve body when the valve seal ring is positioned in sealing relation to the casing interior sealing surface in surrounding relation to such port;
   (e) means for mounting said valve body in said cavity of said casing in concentric relation to the casing for movement of said valve body between a first position wherein said valve seal ring is in sealing contact with said interior sealing surface of said casing in surrounding relation to a first of said ports and said valve passage is aligned to permit flow between a first combination of two of said ports and a second position wherein said valve seal ring is in clearing relation to said first port and said valve passage is aligned to permit flow between a second combination of two of said ports; and
   (f) means for moving said valve body between said first and said second positions.

2. The transfer valve of claim 1 wherein:
   (g) said valve seal structure includes a cylindrical boss extending radially outwardly from the spherical center of said valve body to provide said circular face portion of said valve body;
   (h) said valve seal ring is mounted around said boss in concentric, spaced relation thereto; and
   (i) sealing means is provided between said boss and said valve seal ring to seal the space between said boss and said valve seal ring.

3. The transfer valve of claim 2 wherein:
   (j) said boss is partially defined by a cylindrical exterior wall;
   (k) the valve seal ring is provided with a corner groove opening away from the casing sealing surface and toward the valve body boss, said seal ring corner groove being partially defined by a cylindrical seal ring groove wall spaced from and parallel to said cylindrical exterior boss wall, and said seal ring corner groove being partially defined by a flat, annular seal ring groove shoulder wall normal to the parallel cylindrical seal ring groove and boss walls and shorter in transverse dimension than the cylindrical seal ring groove wall is in longitudinal dimension;
   (l) a flat annular valve body boss shoulder wall extends outwardly from the boss normal to said cylindrical walls and has a shorter transverse dimension than said cylindrical seal ring groove wall has a longitudinal dimension; and
   (m) said means to seal the space between said boss and said valve seal ring includes an O-ring operating in an annular sealing chamber defined by said valve seal ring and boss cylindrical and shoulder walls.

4. The transfer valve of claim 3 wherein:
   (n) said means to urge said valve seal ring outwardly from said valve body includes a plurality of compression springs operative between said valve body and said valve seal ring.

5. The transfer valve of claim 3 wherein:
   (n) said valve passage is aligned to permit flow between a second port and a third port when said valve body is in said first position; and
   (o) said valve passage is aligned to permit flow between said first port and said third port and said valve seal ring is in sealing contact with said interior sealing surface of said valve casing in surrounding relation to said second port when said valve body is in said second position.

6. The transfer valve of claim 5 wherein:
   (p) the valve casing is constituted as two halves joined on a plane passing through the center of a sphere defined by the casing part-cylindrical sealing surface; and
   (q) said plane of joining does not pass through either the first or second port or the area surrounding either port to which the valve seal ring seals.

7. The transfer valve of claim 3 wherein:
   (n) said valve seal ring is generally triangular in cross section and is partially defined by a generally cone-shaped outer wall and a disc-like nose wall intersecting each other at a valve casing spherical sealing surface contact nose circle; and
   (o) the diameter of said nose circle is less than the diameter of said cylindrical seal ring groove wall.

8. A fluid control valve including:
   (a) a valve casing provided with a part-spherical interior sealing surface defining a valve cavity, said casing being provided with a plurality of valve ports open from outside the casing and into said cavity;

(b) a valve body of configuration to fit within a sphere of diameter only slightly less than a sphere defined by the part-spherical interior sealing surface of the valve casing, and of configuration to provide a continuous valve passage;

(c) a valve seal structure movable with the valve body and including an annular valve seal ring and means to urge said valve seal ring outwardly from the valve body, said valve seal structure being adapted to seal the interior of one of said valve ports from the remainder of the valve cavity when the valve seal ring is positioned in sealing relation to the casing interior sealing surface in surrounding relation to such port;

(d) means for mounting said valve body in said valve cavity in said casing in concentric relation to the casing and for moving said valve body between a first position wherein said valve seal ring is in sealing relation to a first of said ports, and a second position wherein said valve seal ring is in sealing relation to a second of said ports; and (e) wherein said valve passage in said valve body is aligned to permit flow between the second and a third of said ports when said valve body is in said first position and wherein said valve passageway is aligned to permit such flow between the first and third of said ports when said valve body is in said second position.

9. The fluid control valve of claim 8 wherein:

(f) said valve seal structure includes a cylindrical boss extending radially outwardly from the spherical center of said valve body;

(g) said valve seal ring is mounted around said boss in concentric, spaced relation thereto; and (h) sealing means is provided between said boss and said valve seal ring to seal the space between said boss and said valve seal ring.

10. The fluid control valve of claim 9 wherein:

(i) said boss is partially defined by a cylindrical exterior wall;

(j) the valve seal ring is provided with a corner groove opening away from the casing sealing surface and toward the valve body boss, said seal ring corner groove being partially defined by a cylindrical seal ring groove wall spaced from and parallel to said cylindrical exterior boss wall, and said seal ring corner groove being partially defined by a flat, annular seal ring groove shoulder wall normal to the parallel cylindrical seal ring groove and boss walls and shorter in transverse dimension than the cylindrical seal ring groove wall is in longitudinal dimension;

(k) a flat annular valve body boss shoulder wall extends outwardly from the boss normal to said cylindrical walls and has a shorter transverse dimension than said cylindrical seal ring groove wall has a longitudinal dimension; and (l) said means to seal the space between said boss and said valve seal ring includes an O-ring operating in an annular sealing chamber defined by said valve seal ring and boss cylindrical and shoulder walls.

11. The fluid control valve of claim 10 wherein:

(m) said means to urge said valve seal ring outwardly from said valve body includes a plurality of compression springs operative between said valve body and said valve seal ring.

12. The fluid control valve of claim 10 wherein:

(m) said valve seal ring is generally triangular in cross section and is partially defined by a generally cone-shaped outer wall and a disc-like nose wall intersecting each other at a valve casing spherical sealing surface contact nose circle; and (n) the diameter of said nose circle is less than the diameter of said cylindrical seal ring groove wall.

13. A fluid transfer valve including:

(a) a valve casing provided with a part-spherical interior sealing surface defining a valve cavity, said casing being provided with at least three valve ports open from outside said casing and through said sealing surface into said cavity;

(b) a valve body provided with a part-spherical outer surface forming part of the outer wall of said valve body and defining a sphere of diameter only slightly less than a sphere defined by the part-spherical interior sealing surface of the valve casing;

(c) said valve body being provided with a valve passage therethrough;

(d) a valve seal structure movable with the valve body and including an annular valve seal ring and means to urge said valve seal ring outwardly from said valve body, said valve seal structure being adapted to seal the interior of one of said valve ports from the remainder of the valve cavity when the valve seal ring is positioned in sealing relation to the casing interior sealing surface in surrounding relation to such port;

(e) said valve seal structure including a cylindrical boss extending radially outwardly from the spherical center of said valve body, said boss being partially defined by a cylindrical exterior wall;

(f) said valve seal ring being mounted around said boss in concentric, spaced relation thereto, said valve seal ring being provided with a corner groove opening away from the casing sealing surface and toward the valve body boss, said seal ring corner groove being partially defined by a cylindrical seal ring groove wall spaced from and parallel to said cylindrical exterior boss wall, and said seal ring corner groove being partially defined by a flat, annular seal ring groove shoulder wall normal to the parallel cylindrical seal ring groove and boss walls and shorter in transverse dimension than the cylindrical seal ring groove wall is in longitudinal dimension;

(g) a flat annular valve body boss shoulder wall extending outwardly from the boss normal to said cylindrical walls and having a shorter transverse dimension than said cylindrical seal ring groove wall has a longitudinal dimension;

(h) sealing means being provided between said boss and said valve seal ring to seal the space between said boss and said valve seal ring, said sealing means including a resilient annular ring operating in an annular sealing chamber defined by said valve seal ring and boss cylindrical and shoulder walls;

(i) means for mounting said valve body in said cavity of said casing in concentric relation to the casing for movement of said valve body between a first position wherein said valve seal ring is in sealing contact with said interior sealing surface of said casing in surrounding relation to a first of said ports and said valve passage is aligned to permit flow between a first combination of two of said ports and a second position wherein said valve seal ring is in clearing relation to said first port and said valve passage is aligned to permit flow between a second combination of two of said ports; and (j) means for moving said valve body between said first and said second positions.

14. The transfer valve of claim 13 wherein:

(k) said means to urge said valve seal ring outwardly from said valve body includes a plurality of compression springs operative between said valve body and said valve seal ring.

15. The transfer valve of claim 13 wherein:

(k) said valve passage is aligned to permit flow between a second port and a third port when said valve body is in said first position; and (l) said valve passage is aligned to permit flow between said first port and said third port and said valve seal ring is in sealing contact with said interior sealing surface of said valve casing in surrounding relation to said second port when said valve body is in said second position.

16. The transfer valve of claim 15 wherein:

(m) the valve casing is constituted as two halves joined on a plane passing through the center of a sphere defined by the casing part-cylindrical sealing surface; and (n) said plane of joining does not pass through either the first or second port or the area surrounding either port to which the valve seal ring seals.

17. The transfer valve of claim 13 wherein:

(k) said valve seal ring is generally triangular in cross section and is partially defined by a generally cone-shaped outer wall and a disc-like nose wall intersecting each other at a valve casing spherical sealing surface contact nose circle; and (l) the diameter of said nose circle is less than the diameter of said cylindrical seal ring groove wall.

18. A fluid control valve including:

(a) a valve casing provided with a part-spherical interior sealing surface defining a valve cavity, said casing being provided with a plurality of valve ports open from outside the casing and into said cavity;

(b) a valve body of configuration to fit within a sphere of diameter only slightly less than a sphere defined by the part-spherical interior sealing surface of the valve casing, and of configuration to provide a continuous valve passage;

(c) a valve seal structure movable with the valve body and including an annular valve seal ring and means to urge said valve seal ring outwardly from the valve body, said valve seal structure being adapted to seal the interior of one of said valve ports from the remainder of the valve cavity when the valve seal ring is positioned in sealing relation to the casing interior sealing surface in surrounding relation to such port;

(d) said valve seal structure including a cylindrical boss extending radially outwardly from the spherical center of said valve body, said boss being partially defined by a cylindrical exterior wall;

(e) said valve seal ring being mounted around said boss in concentric, spaced relation thereto, the valve seal ring being provided with a corner groove opening away from the casing sealing surface and toward the valve body boss, said seal ring corner groove being partially defined by a cylindrical seal ring groove wall spaced from and parallel to said cylindrical exterior boss wall, and said seal ring corner groove being partially defined by a flat, annular seal ring groove shoulder wall normal to the parallel cylindrical seal ring groove and boss walls and shorter in transverse dimension than the cylindrical seal ring groove wall is in longitudinal dimension;

(f) a flat annular valve body boss shoulder wall extending outwardly from the boss normal to said cylindrical walls and having a shorter transverse dimension than said cylindrical seal ring groove wall has a longitudinal dimension;

(g) sealing means being provided between said boss and said valve seal ring to seal the space between said boss and said valve seal ring, said sealing means including a resilient annular ring operating in an annular sealing chamber defined by said valve seal ring and boss cylindrical and shoulder walls;

(h) means for mounting said valve body in said valve cavity in said casing in concentric relation to the casing and for moving said valve body between a first position wherein said valve seal ring is in sealing contact with said casing interior sealing surface in surrounding relation to a first of said ports, and a second position wherein said valve seal ring is in clearing relation to said first port; and (i) wherein said valve passage in said valve body is aligned to permit flow between a first combination of said ports when said valve body is in one of said first and second positions and wherein said valve passageway is aligned to prevent such flow between said first combination of said ports when said valve body is in the other of said first and second positions.

19. The fluid control valve of claim 18 wherein:

(j) said means to urge said valve seal ring outwardly from said valve body includes a plurality of compression springs operative between said valve body and said valve seal ring.

20. The fluid control valve of claim 18 wherein:

(j) said valve seal ring is generally triangular in cross section and is partially defined by a generally cone-shaped outer wall and a disc-like nose wall intersecting each other at a valve casing spherical sealing surface contact nose circle; and (k) the diameter of said nose circle is less than the diameter of said cylindrical seal ring groove wall.

* * * * *